(12) United States Patent
Brunn et al.

(10) Patent No.: US 6,333,975 B1
(45) Date of Patent: Dec. 25, 2001

(54) METHOD AND SYSTEM FOR READING INTELLIGENT UTILITY METERS

(75) Inventors: Brian T. Brunn, Lakeville, MN (US); John W. MacConnell, Spokane, WA (US); Laurent Maleysson, St. Etienne (FR); Eric W. Lofstad, Eagan, MN (US)

(73) Assignee: Itron, Inc., Spokane, WA (US)

( * ) Notice: Subject to any disclaimer, the term of this patent is extended or adjusted under 35 U.S.C. 154(b) by 0 days.

(21) Appl. No.: 09/261,452

(22) Filed: Mar. 3, 1999

Related U.S. Application Data (60) Provisional application No. 60/076,629, filed on Mar. 3, 1998.

(51) Int. Cl.[7] .................................................. H04M 11/00
(52) U.S. Cl. .............................. 379/106.03; 340/870.02; 455/67.1
(58) Field of Search ........... 379/106.01, 106.03–106.11; 340/870.01–870.02

(56) References Cited

U.S. PATENT DOCUMENTS

| | | |
|---|---|---|
| 3,083,357 | 3/1963 | Chapin et al. . |
| 3,656,112 | 4/1972 | Paull . |
| 3,663,762 | 5/1972 | Joel, Jr. . |

(List continued on next page.)

FOREIGN PATENT DOCUMENTS

| | | |
|---|---|---|
| 34830/93 | 9/1993 | (AU) . |
| 0 244 384 A2 | 11/1987 | (EP) . |
| 0 244 384 B1 | 1/1992 | (EP) . |

(List continued on next page.)

OTHER PUBLICATIONS

Automatic Meter Reading and Remote Load Monitoring (AMR/RLM) Business Plan, Databeam, 57 pgs. (date unknown).

Automating Distribution Operations, GRID, vol. 19, No. 3, Fall 1996, 3 pgs.

Broadcast Radio System for Distribution Communications, Altran Electronics, Inc., Jun. 1981, pgs. Index through Appendix B.

Communications Systems for Distribution Automation and Load Management Results of EPRI/DOE Research, W.E. Blair, V.T. Rhyne, Jul. 1982, pp. 42–47.

Databeam Product Line, Mar. 1987, 22 pgs.

*Primary Examiner*—Wing F. Chan
(74) *Attorney, Agent, or Firm*—Patterson, Thuente, Skaar & Christensen, P.A.

(57) ABSTRACT

A meter reading system preferably includes an external modem module (EMM), a hub and a data collection system. The EMM communicates with one or more utility meters and, as such, is preferably selected on the basis that it incorporates a communication format that is compatible with the communication format of the utility meter such that the utility meter does not require modification to be communicatively coupled to the EMM. The EMM obtains meter data from the utility meter and converts to a radio frequency communication format. The radio frequency formatted data is then transferred to the hub. The hub then translates the radio frequency data into an analog or digital telephone communication format, which is then transferred to the data collection system for use by the utility as desired, e.g. utility billing, tracking, control, etc. The data collection system need only recognize one communication format rather than attempting to accommodate numerous message formats such as wires, coaxial cable, optical fiber, or radio frequency.

34 Claims, 6 Drawing Sheets

U.S. PATENT DOCUMENTS

| | | |
|---|---|---|
| 3,688,271 | 8/1972 | Rouse . |
| 3,705,385 | 12/1972 | Batz . |
| 3,729,727 | 4/1973 | Young et al. . |
| 3,742,142 | 6/1973 | Martin . |
| 3,754,250 | 8/1973 | Bruner . |
| 3,786,423 | 1/1974 | Martell . |
| 3,820,073 | 6/1974 | Vercellotti et al. . |
| 3,842,206 | 10/1974 | Barsellotti et al. . |
| 3,858,212 | 12/1974 | Tompkins et al. . |
| 3,868,640 | 2/1975 | Binnie et al. . |
| 3,906,166 | 9/1975 | Cooper et al. . |
| 3,914,757 | 10/1975 | Finlay, Jr. et al. . |
| 3,922,490 | 11/1975 | Pettis . |
| 3,944,723 | 3/1976 | Fong . |
| 3,967,264 | 6/1976 | Whyte et al. . |
| 4,004,097 | 1/1977 | Spaulding . |
| 4,031,513 | 6/1977 | Simciak . |
| 4,035,772 | 7/1977 | Abe et al. . |
| 4,040,046 | 8/1977 | Long et al. . |
| 4,042,906 | 8/1977 | Ezell . |
| 4,075,607 | 2/1978 | Abe . |
| 4,086,434 | 4/1978 | Bocchi . |
| 4,086,504 | 4/1978 | Ezell et al. . |
| 4,119,948 | 10/1978 | Ward et al. . |
| 4,135,181 | 1/1979 | Bogacki et al. . |
| 4,156,129 | 5/1979 | Brugger et al. . |
| 4,166,975 | 9/1979 | Germer et al. . |
| 4,213,119 | 7/1980 | Ward et al. . |
| 4,241,237 | 12/1980 | Parasekvakos et al. . |
| 4,254,472 | 3/1981 | Juengel et al. . |
| 4,264,897 | 4/1981 | Farnsworth . |
| 4,296,411 | 10/1981 | Romanelli et al. . |
| 4,302,750 | 11/1981 | Wadhwani et al. . |
| 4,312,072 | 1/1982 | Vogel . |
| 4,315,251 | 2/1982 | Robinson et al. . |
| 4,316,262 | 2/1982 | Mizuta et al. . |
| 4,337,376 | 6/1982 | Gruenberg . |
| 4,347,498 | 8/1982 | Lee et al. . |
| 4,394,540 | 7/1983 | Willis et al. . |
| 4,396,915 | 8/1983 | Farnsworth et al. . |
| 4,427,968 | 1/1984 | York . |
| 4,451,699 | 5/1984 | Gruenberg . |
| 4,455,453 | 6/1984 | Parasekvakos et al. . |
| 4,500,870 | 2/1985 | Krohn et al. . |
| 4,519,068 | 5/1985 | Krebs et al. . |
| 4,549,004 | 10/1985 | Durham . |
| 4,568,934 | 2/1986 | Allgood . |
| 4,578,536 | 3/1986 | Oliver et al. . |
| 4,589,075 | 5/1986 | Buennagel . |
| 4,597,105 | 6/1986 | Freeberg . |
| 4,614,945 | 9/1986 | Brunius et al. . |
| 4,628,313 | 12/1986 | Gombrich et al. . |
| 4,639,728 | 1/1987 | Swanson . |
| 4,646,084 | 2/1987 | Burrowes et al. . |
| 4,692,761 | 9/1987 | Robinton . |
| 4,698,628 | 10/1987 | Herkert et al. . |
| 4,706,080 | 11/1987 | Sincoskie . |
| 4,707,852 | 11/1987 | Jahr et al. . |
| 4,710,919 | 12/1987 | Oliver et al. . |
| 4,713,837 | 12/1987 | Gordon . |
| 4,724,435 | 2/1988 | Moses et al. . |
| 4,799,059 | 1/1989 | Grindahl et al. . |
| 4,799,062 | 1/1989 | Sanderford, Jr. et al. . |
| 4,803,632 | 2/1989 | Frew et al. . |
| 4,804,938 | 2/1989 | Rouse et al. . |
| 4,809,362 | 2/1989 | Claus et al. . |
| 4,811,011 | 3/1989 | Sollinger . |
| 4,817,131 | 3/1989 | Thornborough et al. . |
| 4,829,540 | 5/1989 | Waggener, Sr. et al. . |
| 4,833,618 | 5/1989 | Verman et al. . |
| 4,864,589 | 9/1989 | Endo . |
| 4,866,733 | 9/1989 | Morishita . |
| 4,866,761 | 9/1989 | Thornborough et al. . |
| 4,881,070 | 11/1989 | Burrowes et al. . |
| 4,887,259 | 12/1989 | Morita . |
| 4,893,332 | 1/1990 | Brown . |
| 4,912,552 | 3/1990 | Allison, III et al. . |
| 4,928,177 | 5/1990 | Martinez . |
| 4,937,569 | 6/1990 | Trask et al. . |
| 4,939,726 | 7/1990 | Flammer et al. . |
| 4,940,976 | 7/1990 | Gastouniotis et al. . |
| 5,007,052 | 4/1991 | Flammer . |
| 5,010,568 | 4/1991 | Merriam et al. . |
| 5,025,470 | 6/1991 | Thornborough et al. . |
| 5,032,833 | 7/1991 | Laporte . |
| 5,032,978 | 7/1991 | Watson et al. . |
| 5,038,140 | 8/1991 | Ikeuchi . |
| 5,056,107 | 10/1991 | Johnson et al. . |
| 5,079,768 | 1/1992 | Flammer . |
| 5,088,108 | 2/1992 | Uddenfeldt et al. . |
| 5,138,615 | 8/1992 | Lamport et al. . |
| 5,155,481 | 10/1992 | Brennan, Jr. et al. . |
| 5,161,153 | 11/1992 | Westmore . |
| 5,161,182 | 11/1992 | Merriam et al. . |
| 5,179,569 | 1/1993 | Sawyer . |
| 5,197,095 | 3/1993 | Bonnet et al. . |
| 5,200,987 | 4/1993 | Gray . |
| 5,243,338 | 9/1993 | Brennan, Jr. et al. . |
| 5,252,967 | 10/1993 | Brennan et al. . |
| 5,262,966 | 11/1993 | Shiihara . |
| 5,270,704 | 12/1993 | Sosa Quintana et al. . |
| 5,276,899 | 1/1994 | Neches . |
| 5,311,581 | 5/1994 | Merriam et al. . |
| 5,321,542 | 6/1994 | Freitas et al. . |
| 5,353,282 | 10/1994 | Dormer et al. . |
| 5,353,412 | 10/1994 | Douglas et al. . |
| 5,363,375 | 11/1994 | Chuang et al. . |
| 5,377,232 | 12/1994 | Davidov et al. . |
| 5,381,136 | 1/1995 | Powers et al. . |
| 5,383,134 | 1/1995 | Wrzesinski . |
| 5,384,777 | 1/1995 | Ahmadi et al. . |
| 5,388,101 | 2/1995 | Dinkins . |
| 5,390,360 | 2/1995 | Scop et al. . |
| 5,408,523 | 4/1995 | McEachern et al. . |
| 5,410,590 | 4/1995 | Blood et al. . |
| 5,434,911 | 7/1995 | Gray et al. . |
| 5,438,329 | 8/1995 | Gastouniotis et al. . |
| 5,446,734 | 8/1995 | Goldstein . |
| 5,448,230 | 9/1995 | Schanker et al. . |
| 5,452,465 | 9/1995 | Geller et al. . |
| 5,455,569 | 10/1995 | Sherman et al. . |
| 5,465,081 | 11/1995 | Todd . |
| 5,469,439 | 11/1995 | Thaler et al. . |
| 5,475,742 | 12/1995 | Gilbert . |
| 5,475,867 | 12/1995 | Blum . |
| 5,477,216 | 12/1995 | Lee, Jr. . |
| 5,481,259 | 1/1996 | Bane . |
| 5,481,546 | 1/1996 | Dinkins . |
| 5,485,150 | 1/1996 | Hisanaga et al. . |
| 5,490,134 | 2/1996 | Fernandes et al. . |
| 5,493,287 | 2/1996 | Bane . |
| 5,495,239 | 2/1996 | Ouellette . |
| 5,499,243 | 3/1996 | Hall . |
| 5,504,746 | 4/1996 | Meier . |
| 5,528,675 | 6/1996 | Chen . |
| 5,535,267 | 7/1996 | Schull . |
| 5,541,589 | 7/1996 | Delaney . |
| 5,546,444 | 8/1996 | Roach, Jr. et al. . |
| 5,553,076 | 9/1996 | Behtash et al. . |
| 5,553,094 | 9/1996 | Johnson et al. . |
| 5,559,894 | 9/1996 | Lubliner et al. . |

| | | | | | |
|---|---|---|---|---|---|
| 5,576,700 | 11/1996 | Davis et al. . | | | |
| 5,583,493 | 12/1996 | Lysen . | | | |
| 5,590,179 | 12/1996 | Shincovich et al. . | | | |
| 5,594,431 | 1/1997 | Sheppard et al. . | | | |
| 5,594,740 | 1/1997 | LaDue . | | | |
| 5,602,744 | 2/1997 | Meek et al. . | | | |
| 5,617,084 | 4/1997 | Sears . | | | |
| 5,664,202 | 9/1997 | Chen et al. . | | | |
| 5,673,252 | 9/1997 | Johnson et al. . | | | |
| 5,696,501 | 12/1997 | Ouellette . | | | |
| 5,717,718 | 2/1998 | Rowsell et al. . | | | |
| 5,719,564 | 2/1998 | Sears . | | | |
| 5,748,104 | 5/1998 | Argyroudis . | | | |
| 5,767,790 | 6/1998 | Jovellana . | | | |
| 5,781,551 | 7/1998 | Born . | | | |
| 5,995,601 | * 11/1999 | Garland et al. | ................. | 379/106.03 | |
| 6,014,089 | * 1/2000 | Tracy et al. | ..................... | 379/106.03 | |

FOREIGN PATENT DOCUMENTS

| | | |
|---|---|---|
| 0 217 824 B1 | 5/1992 | (EP) . |
| 0 631 266 B1 | 12/1994 | (EP) . |
| 0 723 358 A2 | 7/1996 | (EP) . |
| 0 783 211 A2 | 7/1997 | (EP) . |
| 2 061 581 A | 5/1981 | (GB) . |
| 2280 292 A | 6/1994 | (GB) . |
| 2 272 614 B | 6/1995 | (GB) . |
| WO 93/02515 | 2/1993 | (WO) . |
| WO 95/01030 | 1/1995 | (WO) . |
| WO 95/32595 | 11/1995 | (WO) . |
| WO 97/294466 | 8/1997 | (WO) . |
| WO 97/33261 | 9/1997 | (WO) . |

* cited by examiner

METHOD AND SYSTEM FOR READING INTELLIGENT UTILITY METERS

CLAIM TO PRIORITY

This application claims priority to U.S. provisional application having serial No. 60/076,629, filed Mar. 3, 1998, and entitled "Commercial and Industrial Network." This United States provisional application is incorporated by reference herein.

FIELD OF THE INVENTION

This invention is related to utility meters, and, more particularly, to systems with the ability to remotely communicate with and read utility meters

BACKGROUND OF THE INVENTION

There are numerous types of commercial and industrial, intelligent utility meters, as well as other related monitoring and control devices, that are provided by numerous manufacturers. Each of these devices is generally provided with a communication protocol that is unique to the manufacturer. As such, any system that is implemented to remotely read the utility meters, as well as monitoring and control devices, must be able to accommodate the numerous communication protocols, or alternatively, replace the existing devices with devices having a communication protocol that is compatible with the remote communication and reading system.

Obviously, replacing existing devices with devices having a compatible communication protocol adds an extreme amount of additional cost to any remote meter reading system and, as such, is likely not feasible. As such, some proposals for automatic remote meter reading systems presume a certain communication protocol or suggest the retro-fitting of a utility meter to assume a certain communication protocol, e.g. RF communication. Others, such as U.S. Pat. No. 5,239,575, suggest using multiple types of communication links, e.g. wires, coaxial cable, optical fiber, or RF link, to accommodate each communication protocol of each device. Changing the type of link for each communication protocol can make for costly, time-consuming installation and maintenance. Further the data collection system requires a complicated software package for recognizing the various communication signals and converting each of them to a useable format.

Therefore, there is a need for a remote meter reading system that can accommodate a plurality of communication protocols without requiring the replacement of existing equipment and that can simplify the data collection system by requiring it to recognize a single communication protocol.

SUMMARY OF THE INVENTION

The needs described above are in large measure addressed by a meter reading system of the present invention. The meter reading system preferably includes an external modem module (EMM), a hub and a data collection system. The EMM communicates with one or more utility meters and, as such, is preferably selected on the basis that it incorporates a communication format that is compatible with the communication format of the utility meter such that the utility meter does not require modification to be communicatively coupled to the EMM. The EMM obtains meter data from the utility meter and converts to a radio frequency communication format. The radio frequency formatted data is then transferred to the hub. The hub then translates the radio frequency data into an analog or digital telephone communication format, which is then transferred to the data collection system for use by the utility as desired, e.g. utility billing, tracking, control, etc. The data collection system need only recognize one communication format rather than attempting to accommodate numerous message formats such as wires, coaxial cable, optical fiber, or radio frequency.

The present invention also includes a method for collecting data from utility meters, where the utility meters have an identifiable communication format. The method includes the step of selecting an EMM on the basis that the EMM includes a communication format that is identical to the format of the utility meter. Also, the step of communicating with the utility meter via the EMM to obtain utility meter data. The step of translating the utility meter data into a first pre-established communication format, e.g. radio frequency format, if the communication format of the utility meter is not equivalent to the first pre-established communication format. The step of translating the data in the first pre-established communication format to a second pre-established communication format, e.g. analog or digital telephone communication format. And, the step of collecting utility meter data that is only in the second pre-established communication format.

DESCRIPTION OF THE PREFERRED EMBODIMENTS

Figure 1:
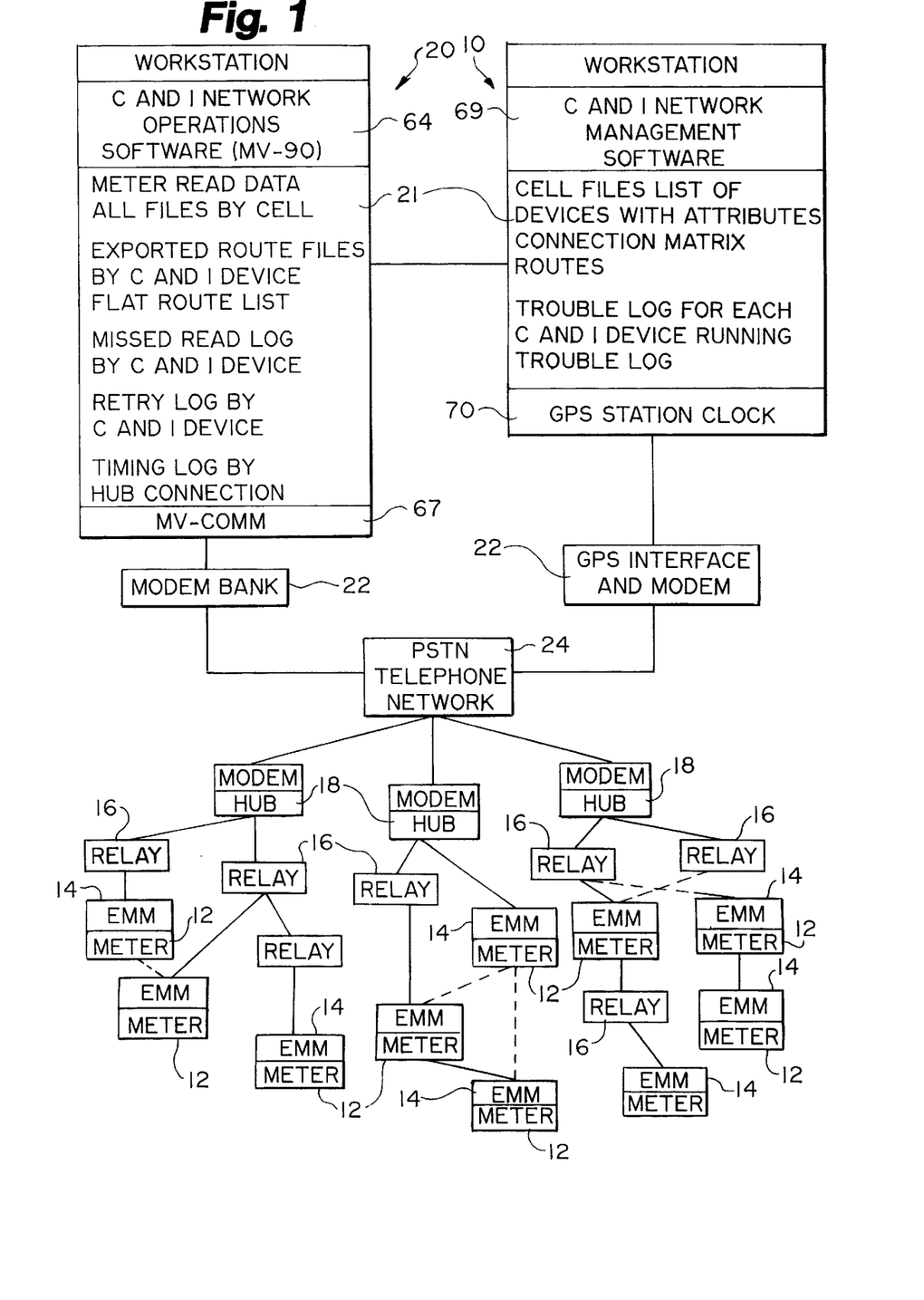
FIG. 1 is a system diagram of a meter reading system of the present invention.

Referring to FIG., 1 a system diagram of a meter reading system 10 of the present invention is depicted. Meter reading system 10 generally incorporates a plurality of intelligent utility meters 12, a plurality of external meter modems (EMMs) 14, a plurality of relays 16, a plurality of hubs 18 and a head-end data collection system 20 that includes one or more personal computers and/or workstations 21. Head-end data collection system 20 communicates to various hubs 18 through modems 22 and a standard, public switched telephone network (PSTN) 24.

Meter reading system 10 is designed to work with numerous types of intelligent utility meters 12 including those that are currently available, such as the ABB Alpha, the ABB Alpha Power Plus, the Schlumberger Vectron, the L&G SX4, the GE KV-96, etc., as well as utility meters 12 that are developed in the future. Each of the various utility meter 12 manufacturers provides its meters with a unique communication protocol that must be accommodated. The present meter reading system 10 accommodates those unique communication protocols by equipping each utility meter 12 with an EMM 14.

External Meter Modems (EMMs)

Figure 2:
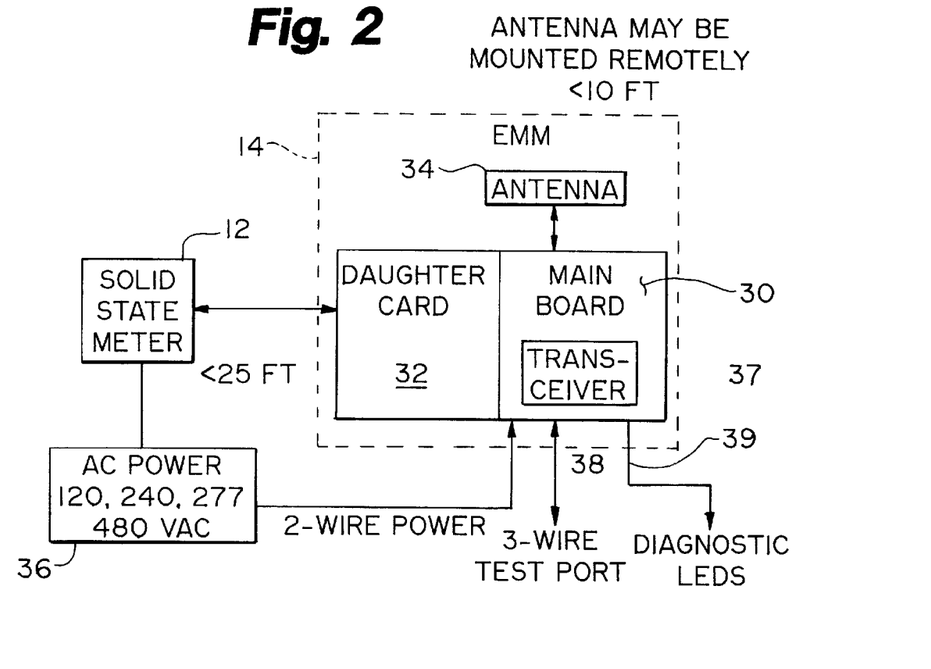
FIG. 2 is a block diagram of an external meter modem (EMM) used in the meter reading system of the present invention.

Each EMM 14, depicted in FIG. 2, is a complete radio modem and preferably includes a main circuit board 30, a daughter board 32 and an antenna 34. Each EMM 14 has its own unique electronically readable identification, e.g. serial EEPROM, and, is preferably powered by an external AC power source 36, e.g. 120, 240, 277 or 480 Volts AC, however, a battery back-up may also be provided. Main circuit board 30, i.e. Itron's C&I Transceiver Board, the specifications of which are described in a document entitled "C&I Specification Summary", Oct. 22, 1998, which is hereby incorporated by reference, preferably incorporates a two-way RF transceiver 37 that combines a high-power transmitter and a high-sensitivity receiver and that supports data rates comparable to wire-line connections. RF transceiver 37 and its associated communication protocol are independent of the communication protocol of utility meter 12. Having the communication protocol of RF transceiver 37 independent of that of the meter provides meter reading system 10 with control over specific meter communication issues to head-end data collection system 20 (to be described in further detail below).

Main circuit board 30 of each EMM 14 is preferably provided with a test port 38 and a plurality of diagnostic LEDs, generally indicated as item 39. Shorting the pins (not shown) within test port 38 causes EMM 14 to initiate a self-test and "who can hear me" messages on both low and high frequencies. A quick flash of LEDs 39 indicates that the self-test of EMM 14 has failed. A solid light of LEDs 39 indicates that EMM 14 has passed the self-test. One flashing LED 39 indicates that EMM 14 has heard another device operating on a low frequency that responded to its "who can hear me" message. Two flashing LEDs 39 indicates that EMM 14 has heard another device operating on a high frequency that responded to its "who can hear me" message. And, three flashing LEDs 39 indicates that EMM 14 has heard a device or devices operating on both high and low RF frequencies.

Daughter board 32 is operably connected to main circuit board 30 and includes its own unique electronically readable identification that is distinct from the identification of EMM 14. The selection of daughter board 32 is dependent on the type of utility meter 12 to which EMM 14 will be connected. Daughter board 32 provides the physical signal format used by the various utility meters 12. For instance, a four-wire, dual current loop (multi-drop capable) daughter board 32 is preferably chosen to operate with an ABB Alpha utility meter 12. Other appropriate daughter boards, by way of non-limiting example, include an RS-485 daughter board and an RS-232 daughter board. Daughter board 32 preferably communicates with utility meter 12 through an external data port (not shown) exiting from the back of utility meter 12.

Antenna 34 is operably connected to main circuit board 30. Antenna 34 may be attached directly to EMM 14 or may be external and mounted separately from EMM 14, however, antenna 34 is preferably kept within 10 feet of EMM 14. EMM 14 itself is preferably mounted on a wall or pole, and, is preferably kept within one thousand feet of its associated utility meter 12. Note that EMM 14 is equipped with the ability to relay both up and down stream messages to other EMMs 14 and relays 16. This ability virtually eliminates the radio "dead spots" that are observed by most traditional radio networks. Further, EMM 14 is provided with the ability to adjust its transmitted power level and accurately measure the strength of received signals.

With regard to the ability to adjust the transmitted power level, EMM 14 actually sets the power level by adjusting the voltage to a final power amplifier (not shown) in the transmitter of RF transceiver 37. An automatic gain control (AGC) loop monitors the transmitter power and adjusts the voltage to the final amplifier such that the output power is the desired value. The value that the power needs to be set to is contained as part of the transmitted message as part of the routing data.

With regard to the ability to accurately measure the strength of received signals, EMM 14 incorporates an integrated circuit that is used for an intermediate frequency (IF) amplifier. This integrated circuit has a power detector that produces an output analog voltage that is proportional to the received signal strength in decibels. This analog voltage is converted to digital form by an analog-to-digital converter and the digital data is then used for subsequent processing.

Relays

Figure 3:
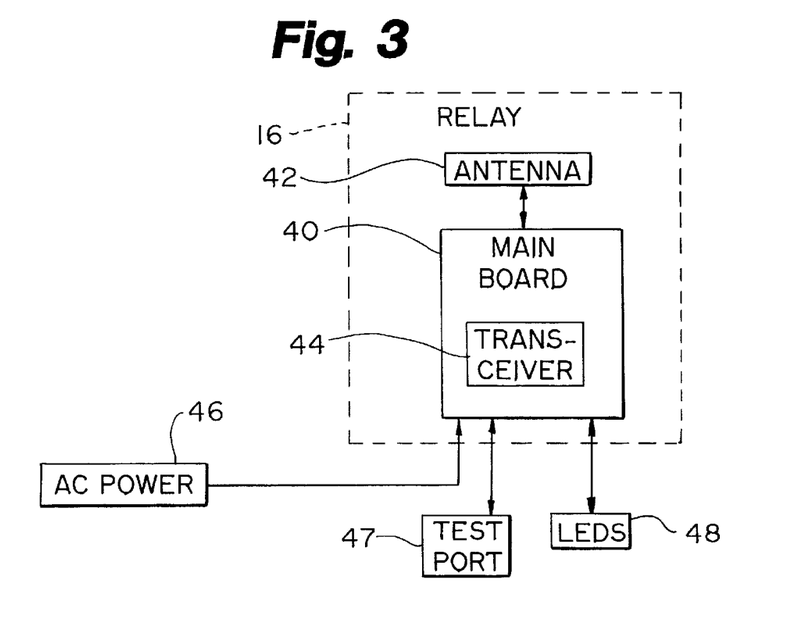
FIG. 3 is a block diagram of a relay used in the meter reading system of the present invention.

Each relay 16, like that depicted in FIG. 3, is also a complete radio modem like EMM 14 and, as such, includes a main circuit board 40 and an antenna 42 that may be located internally or externally of relay 16. Main circuit board 40 preferably incorporates a two-way RF transceiver 44 that combines a high-power transmitter and a high-sensitivity receiver, and, that supports data rates comparable to wire-line connections. Main circuit board 40 is operably connected to antenna 42 and uses a communication protocol that is identical to the communication protocol of main circuit board 37 of EMM 14. Relay 16, like EMM 14, has its own electronically readable identification, and is preferably powered by an external AC power source 46, e.g. 120, 240, 277 or 480 Volts AC. A battery back-up is preferably provided. The battery back-up of relays 16 and EMMs 14 allow specific portions of meter reading system 10 to remain operational throughout moderate power outages. Once again, like EMM 14, relay 16 is preferably provided with a test port 47 and a plurality of LEDs 48 so that a test of relay 16 may be performed upon site installation. The test performed is like that performed with EMM 14.

EMMs 14 generally operate to provide meter data transmissions to hub 18. If a specific EMM 14 is not close enough to hub 18 to transmit its data directly, another EMM 14 may act as an intermediary to receive data transmissions and forward them to hub 18. However, where the density of utility meters 12 is not sufficient to generate complete EMM 14 to hub 18 or EMM 14 to EMM 14 transmissions (EMMs 14 are preferably within 500 feet of each other to relay transmissions from one another), relays 16 may be strategically positioned to complete EMM 14 data transfers to hub 16. Because relays 16 are dedicated to the task of relaying messages (relays 16 perform no data storage function) from EMMs 14, a daughter board for connection to a utility meter is not needed. To enhance the ability to transfer messages to and from EMMs 14, relays 16 are preferably mounted in an elevated location such as a pole or side of a building. The high mounting of relays 16 provides them with a considerable communication range. For example, rather than the 500 feet range of an EMM 14 to EMM 14 message transfer, a message transfer between EMM 14 and relay 16 may occur in the distance range of 500 to 2000 feet, while relay 16 to relay 16 message transfers may occur at over 2000 feet.

Hubs

Figure 4:
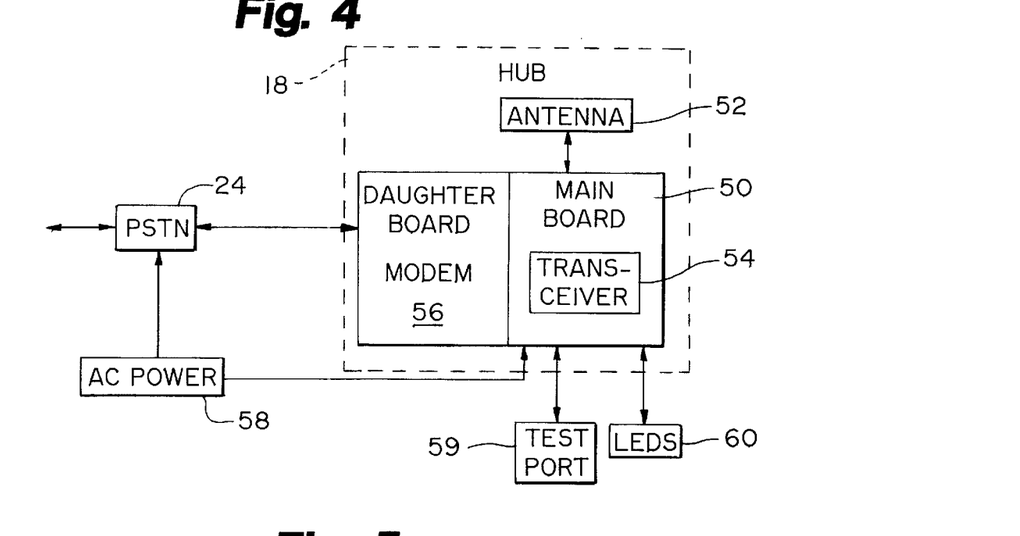
FIG. 4 is block diagram of a hub used in the meter reading system of the present invention.

Hub 18, as shown in FIG. 4, is the node within meter reading system 10 where the radio message transmissions from EMMs 14 and/or relays 16 are transferred onto wire-line connections. Like EMMs 14 and relays 16, hub 18 preferably includes a main circuit board 50 and antenna 52, which is operably coupled to main circuit board 50 and may be located internal or external to hub 18. Main circuit board 50 preferably incorporates a two-way RF transceiver 54 that combines a high-power transmitter and a high-sensitivity receiver. Hub 18 additionally includes a daughter board 56 that preferably comprises a telephone modem. Messages received by hub 18 from EMMs 14 and/or relays 16 are converted to a format for transfer over PSTN 24 to head-end data collection system 20. Messages received by hub 18 from head-end data collection system 20 are converted to a format for RF transfer to EMMs 14 and/or relays 16. Hub 18 is preferably powered by an external AC power source 58, e.g. 120, 240, 277 or 480 Volts AC, and may include a battery back-up. Hub 18 is preferably mounted on a pole or building; building mounting allows the option of convenient telephone line installations. Additionally, hub 18 preferably includes a test port 59 and LEDs 60 to perform testing of hub 18 upon site installation. The test performed on hub 18 is like that performed on EMMs 14 and relays 16.

Head-end Data Collection System

Figure 5:
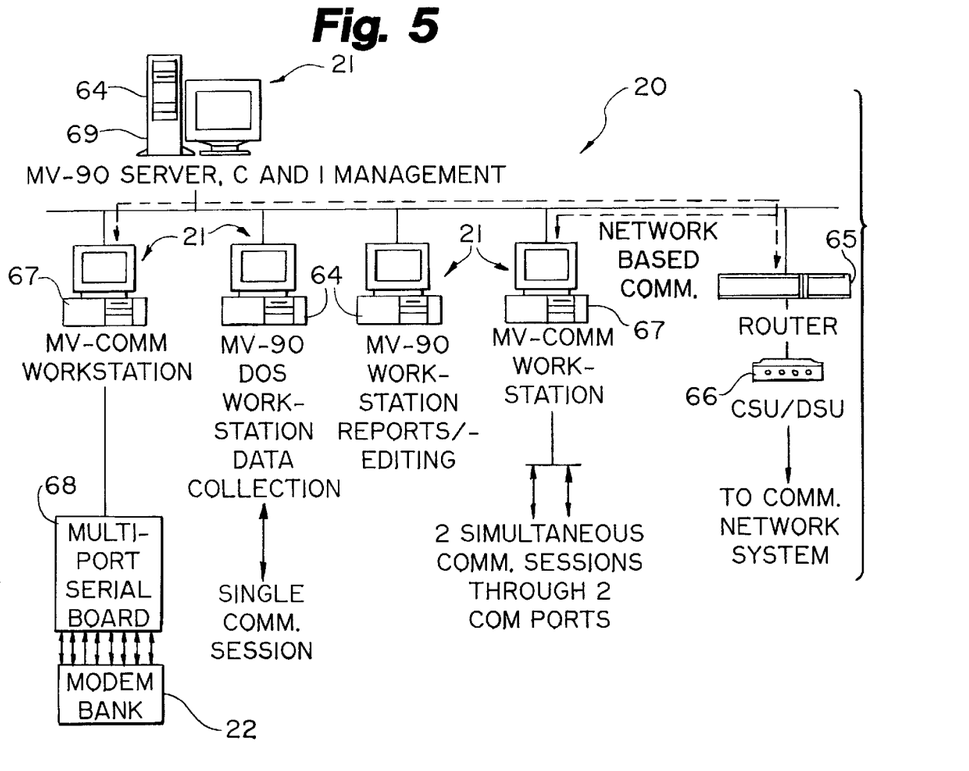
FIG. 5 is a diagram of a typical head-end data collection system used in the meter reading system of the present invention.

Head-end data collection system 20, a typical configuration is shown in FIG. 5, operates to execute the functions of meter reading system 10. More specifically, head-end data collection system 20 performs configuration, maintenance, task scheduling, data retrieval, data analysis, and data reporting functions. Head-end collection system preferably comprises the Itron, Inc. (Spokane, Wash.) MV-90 platform 64 in combination with the Itron, Inc. MV-COMM processor and software 67 application and the Itron, Inc. Commercial and Industrial (C&I) Network Management software 69 application. As background, a brief description of the operation of the MV-90, MV-COMM, and the C&I network management software is provided herein.

Head-End Data Collection System: MV-90

The MV-90 base package software 64 maintains files, imports and translates information from the various hubs 18, as well as portable reader systems, and corrects the imported data. Users can define data validation criteria and the MV-90 system will mark any file that fails, edit the information, and establish an edit log. The MV-90 software 64 also creates translation summaries, interval pulse data, interval load data, KVA analysis, and peak reports. The MV-90 software 64 may run on a single PC using standard operating systems, or on multiple PCs that are on a local area network, as shown in FIG. 5.

The MV-90 software 64 accommodates several methods of data acquisition and management. The remote interrogation package of the MV-90 software 64 is used to retrieve data from hubs 18, and, if desired, from recorders, registers, meters, and gas volume correctors through telephone lines and other communication media. The totalization package of the MV-90 software 64 compiles interval load data from individual utility meters 12 into a summary file. The information is then stored in an historical database of the MV-90 software 64. The time-of-use package of the MV-90 software 64 converts load profiles into time-of-use data, which can then be used in billing and determining utility rates. The graphics package of the MV-90 software 64 can be used to plot interval and summary load data for selected time periods, and, is compatible with color monitors, line printers, and plotters.

Additionally, the MV-90 software 64 may export data in a variety of file formats to interface with spreadsheet billing, and other software, as well as any ODBC (open database connectivity) compliant database. The load research package of the MV-90 software 64 is able to sort groups of utility customers by class, domain, strata, jurisdiction, and system. Users can choose from several data analysis tools to compile useful statistics about commercial and industrial customers. For instance, the MV-90 software 64 may perform radio estimation, weighted mean, demographic databases, class statistic reports, linear regression plots, and confidence limit plots. The load control feature of the MV-90 software 64 notifies and interrupts large power customers on direct load control or voluntary interruptible rates, including those with "buy-through" provisions. MV-90 software 64 load control supports a test mode for checking communication and on-site equipment, peak load control for planned implementation when there is sufficient time to verify service interruption, and emergency load control when there is not sufficient time. It also produces load control logs and reports.

The gas nomination and balancing system of the MV-90 software 64 maintains a database of transportation contracts, validates customers' daily or monthly gas nominations, balances actual usage against those nominations, and posts a report to the internet or an electronic bulletin board via a router 65 and channel service unit 66, shown in FIG. 5. The real-time pricing module of the MV-90 software 64 enables customers to monitor energy consumption and manage usage in response to rate changes. The system automatically transmits hourly pricing data via telephone, AT&T EasyLink™, bulletin board, or the internet to a real-time station database on a PC at a commercial or industrial site. The customer may retrieve load data directly from the billing meter and combine that information with hourly prices to calculate energy consumption.

Head-End Data Collection System: MV-COMM

The MV-COMM 67 is a processor and application software that is used with the MV-90 platform 64 to greatly enhance communication between meters and host processor. By using MV-COMM 67, utilities can perform multiple meter interrogations simultaneously from the same workstation 21. The scaleable communications processors of MV-COMM 67 can read up to thirty-two meters simultaneously using a multi-port serial board 68 in combination with modem bank 22 (see FIG. 5) thereby enabling the MV-90 software to efficiently handle complex metering and data collection for large numbers of commercial and industrial customers.

In addition, the MV-COMM 67 processor supports a variety of communication formats, including TCP/IP, telephone, cellular (digital and analog) and Ardis. MV-COMM 67 provides MV-90 platform 64 with more flexibility to implement and support new wired and wireless communication technologies as they are introduced into the marketplace. This is done by assigning "protocol DLLs" (dynamic link library) to communication ports, limiting any changes required to the base MV-90 processing software 64 and user interfaces. Further, MV-COMM 67 provides powerful scaling capabilities and flexible communications architecture that enables utilities using MV-COMM 67 to make the transition from systems that struggle to serve low volumes of commercial and industrial customers to successfully managing high volumes of advanced metering data from large numbers of customers spread over a wide area.

Head-End Data Collection System: C&I Network Management

The C&I Network Management software 69 works in conjunction with the MV-90 platform 64 and MV-COMM 67, and operates to generate the specific routes to each EMM 14 and its associated utility meter 12. To establish the appropriate routes, the C&I network management software 69 utilizes an automated discovery process. In doing so, the C&I network management software 69 sends out a "who can hear me" RF message. EMMs 14 and relays 16 provide a response to the message that indicates their existence and location. Note that the C&I network management software 69 may be used to identify and set up routes for a plurality of EMMs 14 and relays 16, i.e. handle initial bulk installation, as well identify individual EMM 14 or relay 16 installation or removal.

Through the power control and received signal strength for each EMM 14 and relay 16, C&I network management software 69 evaluates the radio path from every EMM 14 or relay 16 to every other EMM 14 or relay 16. Each link from one device to all others can be characterized by a pathloss. This pathloss is the apparent power loss from one transmitter to another receiver and is caused by free space dispersion and other effects including reflection and absorption due to buildings, foliage, etc. Additionally, even though these links are static (i.e. transceivers are not moving), the pathloss will vary randomly in time with a typical range being from 0 to 15 dB additional pathloss. This variation in pathloss is generally termed fading and is caused by the movement of foliage, vehicles, pedestrians, etc.

The typical transmitter power range is from 0 to +30 dBm (dB referenced to 1 milliwatt) and the typical 1% frame-error-rate receiver sensitivity is −110 dBm. This results in a maximum allowable pathloss of 140 dB. However, taking into consideration the fading, the typical maximum pathloss allowed is 20 dB lower than 140 dB, or in other words, 120 dB.

Using this criteria, the optimal routes are determined by evaluating a two-dimensional pathloss matrix from received signals in order to determine the paths with the least number of links while maintaining no link with a pathloss greater than 120 dB. The minimum number of links is chosen in order to reduce the likelihood of a dropped message packet and to minimize the time required to interrogate a device. In the event that no path exists with all links of less than 120 dB pathloss, then a gracefully degrading heuristic algorithm is preferably employed to determine the optimal routes.

With the two-dimension pathloss matrix, C&I network management software 69 preferably develops the two best routes for the operations software, the MV-90. In reference to time and power, the best route is usually that which allows a utility meter 12 to be read within 20 seconds, if daily utility meter 12 reading is desired, and requires the minimum amount of power. In general, for daily meter reading, a utility meter reading message undergoing four hops, where a hop is defined as the transfer of a message from one EMM/relay/hub to another, will meet the 20 second message transfer rate that is desired. A message transfer undergoing seven hops will generally require approximately 30 seconds, and is the maximum number of hops that is recommended for efficient operation of meter reading system 10. If more than seven hops are required to transfer a message to or from utility meter 12, additional relays 16 should be installed in order to keep the number of hops to a maximum of seven.

Once C&I network management software 69 determines the initial routes, software 69 continues to operate and to analyze log files generated by the MV-90 software 64 to determine required system maintenance procedures. For instance, if an established route between EMMs/relays/hubs fails, C&I network management software 69 utilizes the position location information from each EMM/relay/hub to facilitate a search to sort EMMs/relays/hubs based on their likely ability to used in alternate communication routes, and then, establishes those routes.

In addition, C&I network management software 69 performs maintenance, calibration procedures. Using a global positioning system (GPS) station clock 70, indicated in FIG. 1, timing pulses are transmitted over the public switched telephone network (PSTN) 24 to frequency lock the reference oscillator (not shown) of transceiver 54 within each hub 18. The time reference in each hub 18 is then passed on, through frequency counting of operational messages and a control loop, to each EMM 14 and relay 16 in the system 10. This allows each EMM 14 and relay 16 to adjust the oscillators (not shown) within transceivers 37 and 44, respectively, to maintain their transmission frequency and to remain inside of allocated frequency channels. Each EMM 14 and relay 16 may adjust the frequency calibration of any adjoining EMM 14 or relay 16. Further, each EMM 14 and relay 16 may perform frequency calibration while simultaneously transporting normal utility meter reading message radio traffic thereby eliminating the need for a separate calibration/maintenance period. Further, the use of GPS timing pulses for calibration eliminates the need for periodic shop service of hubs 18, EMMs 14 and relays 16, that is usually required with other commercially available radio products. This greatly reduces the maintenance costs of meter reading system 10.

Hub 18, as well as EMMs 14 and relays 16, are preferably contacted once per day for calibration to correct for frequency aging. Contact once per week for calibration is the absolute minimum that should be allowed to maintain reliable operation of meter reading system 10. C&I network management software 69, can perform other duties to maintain meter reading system 10. For instance, as hub 18, EMMs 14 and relays 16 may incorporate battery back-ups, C&I network management software 69 can provide notice that the back-up battery should be changed out, e.g. every four years.

Meter Reading System Layout

Figure 6:
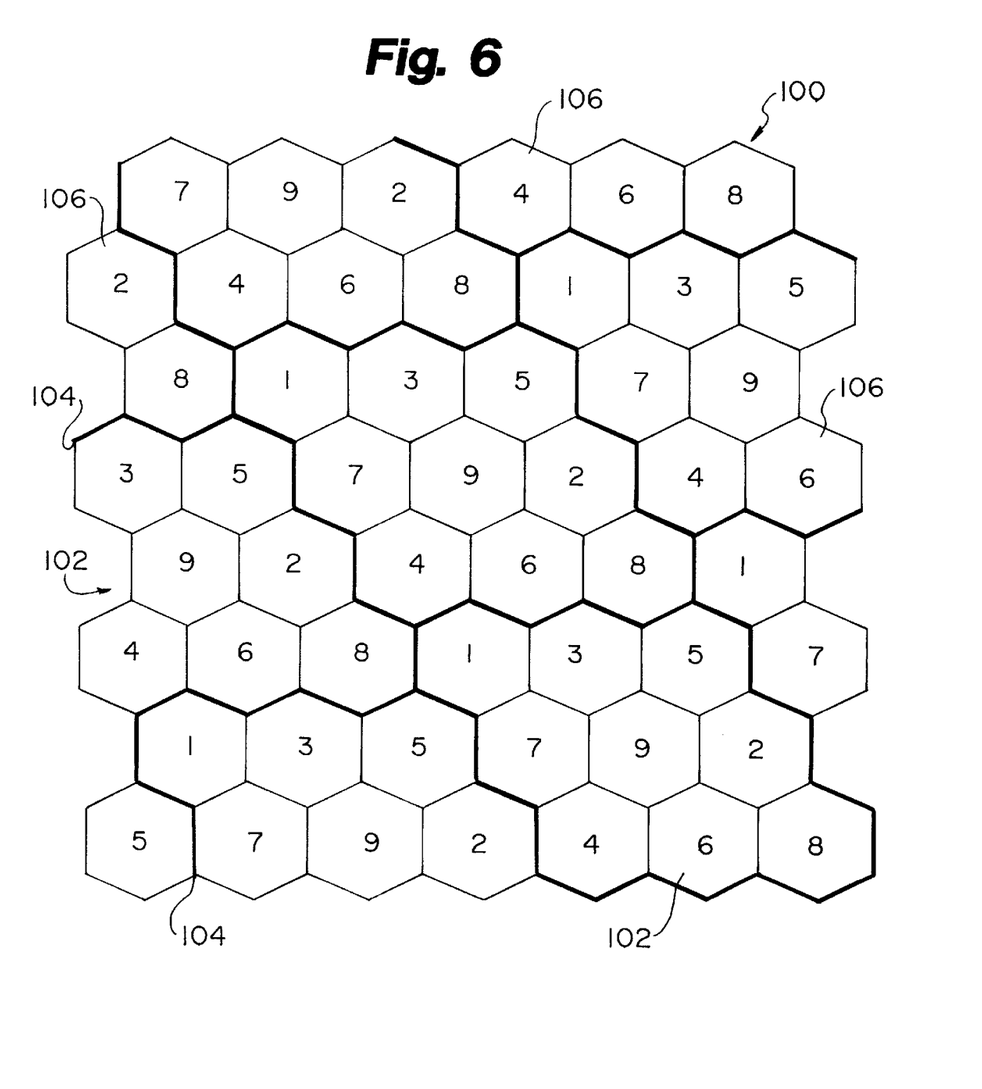
FIG. 6 depicts a sample cell grid of the present invention.

In establishing meter reading system 10 of the present invention, the first step is to layout a cell grid 100, a sample cell grid 100 is shown in FIG. 6. Cell grid 100 is initially laid out by identifying potential service locations, e.g. greater than 20 kW, single and poly-phase, by estimating growth potential in identified geographic areas, identifying desired read timing, e.g. identify the types of utility meters and their associated timing characteristics as well as identify the desired read rate, daily vs. hourly, and by generating latitudinal/longitudinal data from service addresses. With the initial cell grid established, a density analysis is preferably performed to determine the number of utility meters within the cell and to identify low and high density areas. The cell grid 100 may then be adjusted to accommodate density data—numerous iterations of the density analysis may be required to achieve the final cell grid 100. As detailed earlier, individual cell size are preferably 0.5 to 1.5 square miles in area. It should be noted that cell assignments are driven primarily by underlying utility meter density not by propagation characteristic.

Once the final cell grid 100 has been created, groupings of cells 102 are designated and defined by borders 104 and each cell 106 within a certain cell grouping 102 is assigned a specific frequency channel on which to communicate. Typically, a cell grouping 102 includes nine cells 106 and, thus, nine frequency channels, however, up to twelve cells 106 and twelve frequency channels may be used within a cell grouping 102. Of course, more or less frequency channels may be used without departing from the spirit or the scope of the invention. These frequency channel assignments are then repeated within each cell grouping 102. This manner of assigning frequency channels in a cell configuration facilitates the simultaneous communication to all hubs 18 within meter reading system 10.

Within an individual cell grouping 102, each cell 106 number, e.g. 1–9, refers to a frequency channel. The higher the number of cell 106, the higher the frequency. Thus, adjacent numbers are adjacent channels. Since all cells 106 in an individual cell grouping 102 are unique they are all on unique channels and therefore do not interfere with one another, even if they are all operating simultaneously. Further, in order to prevent interference between adjacent channels, no two adjacent cells 106 use adjacent channels. For example, the cell number one is next to cells three, seven, five, eight, four, and six. There are at least two cells 106 between occurrences of adjacent channels.

System 10 is designed so that adjacent cell groupings 102 can each have all of the cells 106 within their boundaries 104 operating simultaneously without interfering with adjacent cell groupings 102. This is similar in principal to how the cellular telephone system operates, and is achieved by maintaining a distance of at least two cell 106 diameters between the reuse of a channel. With the topology chosen, the pathloss between cells 106 of the same number is such that they do not interfere with one another. This is achieved through the use of power control and different channels for "high" and "low" devices, see FIG. 7.

Figure 7:
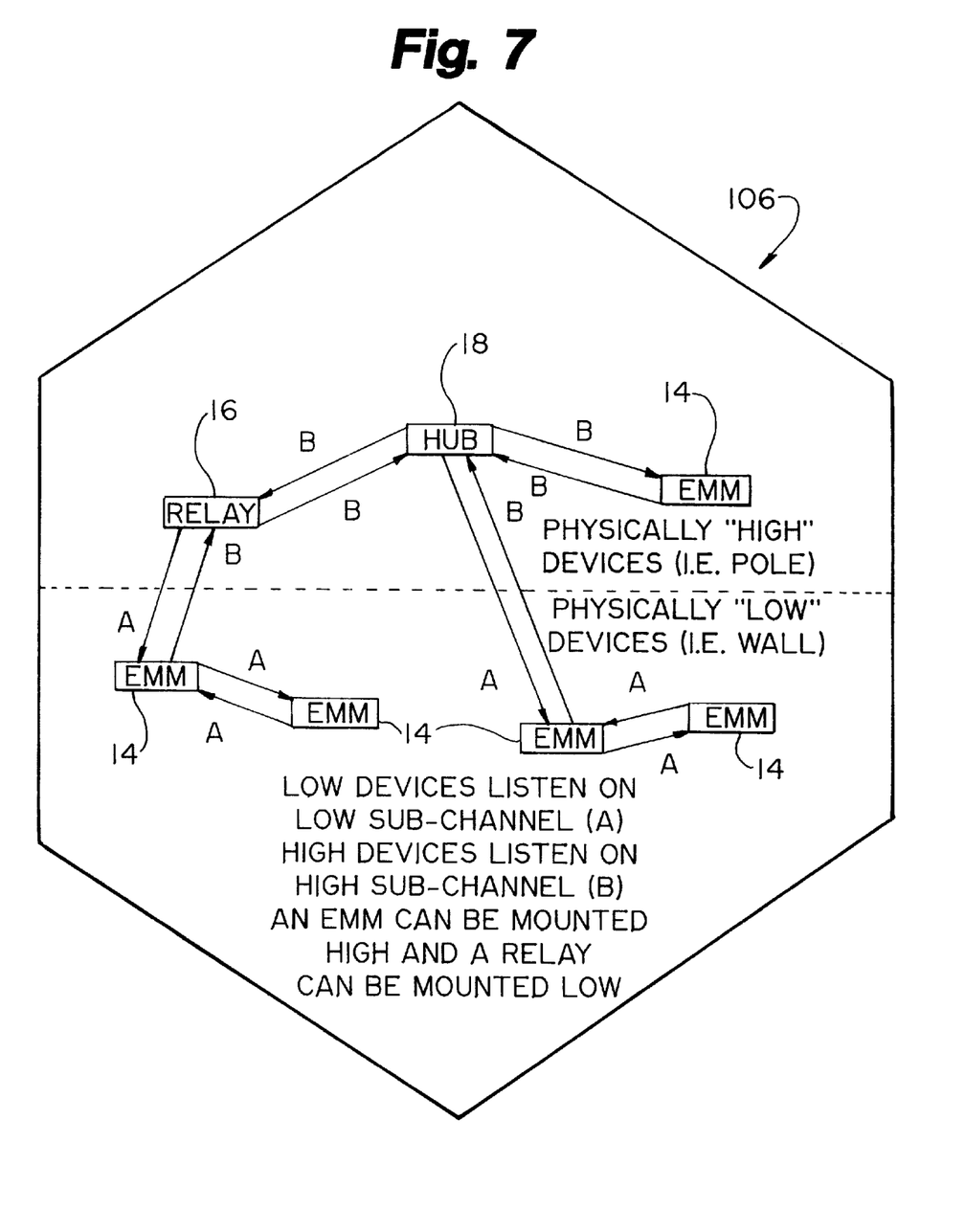
FIG. 7 diagrams a dual sub-channel approach taken within each cell of the cell grid of FIG. 6.

Devices that are "high" are typically mounted on poles or other tall structures. Since they are high, the pathloss between them is typically relatively low. Their transmitter power can be, and is preferably, set at reduced levels (the correct power level is determined during the "discovery phase", and checked periodically by the network management software). This provides sufficient received signal for reliable communications without causing interference to nearby cell groupings 102 using the same channel.

Devices that are "low" are typically mounted on buildings near the ground. High devices attempting to communicate with low devices or low devices communicating with other low devices can be expected to required higher power levels because of obstructions that are likely to be found between them. Take the example of a "high" device talking to a "low" device. The "high" device uses the low channel and is likely operating at a relatively high power setting. This will not interfere with adjacent cell groupings 102 because "low" devices in that cell grouping 102 will be isolated from the high power transmissions from the "high" device transmitting on the "low" channel by terrain.

When a "low" device responds to a "high" device, it uses the high channel and is likely to be running at high power. Again, the "low" device transmission does not interfere with devices in adjacent cell groupings 102 due to terrain.

With channel assignments for each cell 106 of each cell grouping 102 chosen, the location of hub 18 is preferably identified. Hub 18 is preferably located substantially in the center of its associated cell 106. Next, knowing the location of each utility meter 12, and as such, its corresponding EMM 14, as well as the location of hub 18, the location of relays 16 are preferably identified. As indicated earlier, each relay 16 is preferably mounted in a high location, e.g. a pole, and is within 500 to 2000 feet of an individual EMM 14 and, further, is within 2000+ feet of another relay 16. The density of relays 16 within an individual cell 106 should be driven by propagation characteristics and EMM 14 clustering; there is a desire to reduce the number of hops for each message transmission to and from utility meters 12. A typical cell 106 configuration will find three to ten relays 16 per EMM 14, however, greater or fewer relays 16 may be used without departing from the spirit or scope of the invention.

With the desired location of all devices identified, hub 18 is preferably installed and appropriate telephone wiring run to its daughter board modem 56. EMMs 14 and relays 16 are also preferably installed. With each EMM 14 and relay 16, the main circuit board, 30 and 40, respectively, is set to the desired communication band, communication channel number, and to indicate whether the device is high- or low-mounted. For each EMM 14, the proper daughter board 32 is selected for its corresponding utility meter 12, the utility meter 12 is configured for external communications, and daughter board 32 is operably coupled to utility meter 12. Power is then preferably supplied to all devices. Main circuit board,30 and 40, of each EMM 14 and relay 16 is preferably provided with a test port and diagnostic LEDs, which allow the installer to confirm that the device has passed a self-test and that other devices have been heard. These tests were described earlier in detail with reference to each device.

With all devices installed, the MV-90 application is used to assign a database cell file to each hub 18. Then, the attributes of each EMM 14 and relay 16, including precise location as well as a variety of performance statistics, that are associated with each hub 18 and cell 106 are entered into the corresponding cell file. Next, head-end data collection system 20 contacts hubs 18 via PSTN and C&I network management software 69 performs its "discovery phase."

The "discovery phase", along with the addressing (high or low device) of each EMM 14 and relay 16, determines which of the two frequency sub-channels EMM 14 or relay 16 will transmit on. In the "discovery phase", each EMM 14 and relay 16 sequentially activates each sub-channel with a generic broadcast mechanism in response to a "who can hear me" call from C&I network management software 69. Then, upon discovery of the device (EMM/relay/hub) by C&I network management software 69 from the response to the generic broadcast, the actual sub-channel being utilized is then used to determine a portion of an individual EMMs 14 or relays 16 operational address, which generally comprises the device's serial number, whether the device is "high" or "low", whether a battery back-up is present and additional information as desired. When an individual EMM 14 or relay 16 is operational and it is relaying messages, the next intermediate destination address will instruct the relaying device, EMM 14 or relay 16, which sub-channel to utilize. As discussed earlier in this section, FIG. 7 diagrams high and low sub-channels within an individual cell 106.

Additionally, adjacent channel and inter-modulation rejection characteristics, which contribute significantly to the cost of a transceiver, are addressed. That is, by using location data on each EMM 14 and relay 16, the order in which these devices are accessed within their cellular assignments is selected to minimize adjacent channel and inter-modulation interference, thus reducing the capabilities needed in transceivers 37 and 44 for a given level of system 10 disruption. Due to the isolation created by propagation, the mechanism used to minimize interference is to generally not access devices, EMMs 14 or relays 16, near the edges of a cell boundary 104 while simultaneously accessing devices in an adjacent cell 106 that are near the shared boundary 104. Inter-modulation interference is reduced by avoiding simultaneous access of devices in corners of cells where three boundaries 104 intersect.

After the "discovery phase" to determine which EMMs 14 and relays 16 respond, missing EMMs 14 and/or relays 16 are identified. Marginal links between devices are also identified. It is then determined whether additional relays 16 should be installed within the system 10 to complete message transfers. If additional relays 16 and/or EMMs 14 need to be installed, the new devices are installed with appropriate cell parameters set, a single device search from the C&I network management software is performed to "discover" the device, and the attributes of the device are entered into the database cell file. System 10 layout is now complete. As such, device routes are preferably exported to the MV-90 platform 64 and the MV-90 software 64 is configured with the desired read parameters, e.g. timing schedule for reading cell grid 100. A new EMM 14 and/or relay 16 may be added to system 10 at anytime by following the procedures described above.

Figure 8:
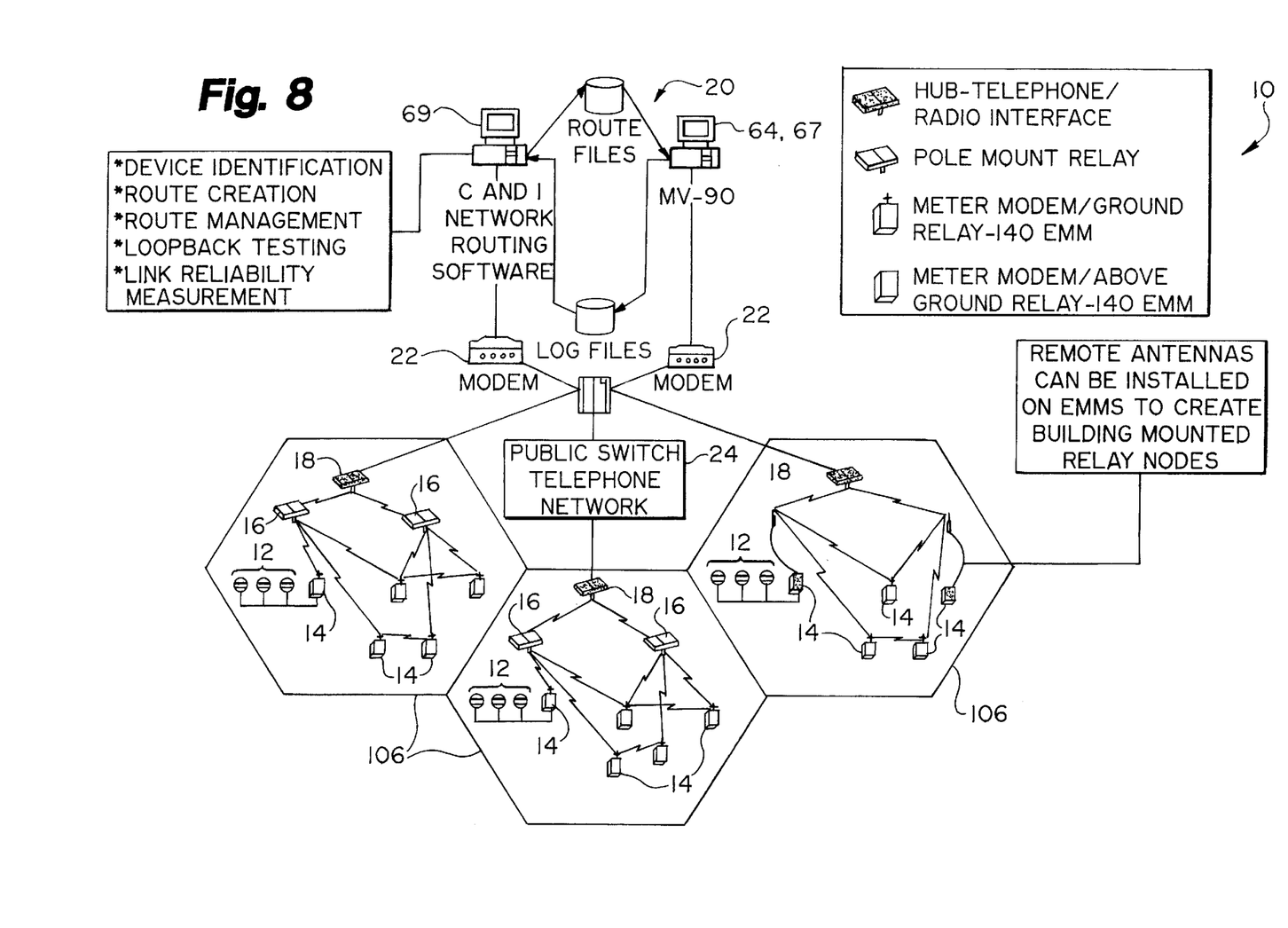
FIG. 8 depicts a detailed diagram, including cell structure of the meter reading system of the present invention.

FIG. 8 depicts a detailed layout of meter reading system of the present invention and shows the lines of communication between head-end data collection system 20 and a plurality of cells 106.

Operation of Meter Reading System

With all devices installed, all attributes entered into the MV-90 database 64 and the timing schedule for reading cell grid 100 established, head-end data collection system 20 may place a single secure dial-up to hubs 18, remembering that MV-COMM 67 allows MV-90 platform 64 to communicate with at least thirty-two hubs 18 simultaneously, MV-90 may interrogate all utility meters 12 assigned to hubs 18; hubs 18 establish individual RF communication sessions with each utility meter 12. This operation is analogous to a daisy-chain read of multiple meters linked to one telephone modem. In placing the call to hubs 18, head-end data collection system 20 transmits information describing the data-rate, inter-byte, no-byte timeout, and repeat times to each end-point EMM 14 that is to be used by EMM 14 in the local communication with its associated utility meter 12. As such, meter reading system 10 exhibits a pass-thru protocol that allows unique meter specific information to reside only at the head-end of meter reading system 10 thereby allowing meter reading system 10 to communicate with a plurality of different utility meters (and other monitoring devices and control devices) having different and unique communication protocols. Further, as all utility meters 12 in a hub's cell are interrogated with a single telephone call, the modem negotiation and dialing times are greatly reduced and, correspondingly, the data throughput of the system is increased. Moreover, the addition of new devices to system 10 only requires that the appropriate daughter card be selected and that correct device information be entered into head-end data collection system 20, installation time is minimal.

After a query from head-end data collection system 20 to hub 18 and then to utility meters 12, each utility meter 12 returns the requested meter information by transferring the information to its associated EMM 14 and from there, to another EMM 14 or relay 16 as necessary, to eventually reach hub 18. Hub 18 converts the format of the data and transfers the data via PSTN to head-end data collection system 20 for use as desired.

An example of a message transfer from an individual hub 18 to an individual EMM 14 is provided below to give additional insight into the routing of a message. Example: A message is to go from HUB #7000 ultimately to EMM #10030. The message contains a pointer that indicates to the intermediate destination device, and a variable that contains the number of hops in the path. In addition, the message contains a flag showing whether the message is outgoing, i.e. from HUB #7000 to EMM #10030, or returning, i.e. EMM #10030 to HUB #7000. The steps in the message transfer are:

Step 1:
   HUB #7000 sets its power to the value contained in the message for this device, and transmits the message.
   Pointer=1 (Indicating the message is to EMM #10000)
   Direction="Outbound"
   Number of Hops=4

Step 2:
   EMM #10000 receives the message. The pointer is at 1, meaning the message is to EMM #10000. EMM #10000 is not the final destination in the route, so it increments the pointer, sets its power to the value contained in the message for this device, and retransmits the message.
   Pointer=2
   Direction="Outbound"
   Number of Hops=4

Step 3:
   EMM #10010 receives the message. The pointer is at 2, means the message is to EMM #10010. It is not the final destination in the route, so EMM #10010 increments the pointer, sets its power to the value contained in the message for this device, and retransmits the message. (Note: EMM #10010 may also receive the message from HUB #7000. However, because the pointer is set to 1, and EMM #10010 is designated number 2 in the message route, EMM#10010 ignores the message from HUB #7000).
   Pointer=3
   Direction="Outbound"
   Number of Hops=4

Step 4:
   Relay #11020 receives the message. The pointer is at 4, meaning the message is to Relay #11020. It is not the final destination in the route, so it increments the pointer, sets its power to the value contained in the message for this device, and retransmits the message.
   Pointer=4
   Direction="Outbound"
   Number of Hops=4

Step 5:
   EMM #10030 receives the message. The pointer is at 4, equaling the number of hops, meaning it is the final destination. EMM #10030 unwraps the data contained in the message and sends it to its daughter board which then interprets the message and acts upon it as required.

Additional information on message transfer is provided in Itron's "C&I Protocol Summary", Oct. 26, 1998, which is incorporated by reference herein.

Because, each utility meter 12 is generally being visited on a daily, or even hourly, basis, head-end data collection system 20 generally need not support unsolicited messages, i.e. a battery low message. Rather, head-end data collection system is able to create a trouble log indicating that an individual utility meter 12, EMM 14, relay 16 or hub 18 is non-operational. Once the trouble log has been reviewed by the head-end data collection system 20, the C&I network management software 69 may initiate a diagnostic test in which it may determine, by way of non-limiting example, whether: (1) there is a power outage at an individual utility meter 12, EMM 14 or relay 16; (2) there is a power outage at an upstream EMM 14 or relay 16; (3) there has been a permanent route change, e.g. due to a new obstructing structure within the RF transmission route; (4) there is a temporary route change, e.g. due to a temporary structure, such as a truck, within the RF transmission route; (5) there is interference in a transmission route due to co-channel interference, adjacent-channel interference, or adjacent-channel inter-modulation; (6) there is interference from an external device; (7) there has been an individual utility meter 12 failure; (8) there has been an EMM 14 or relay 16 failure; and (9) there has been an upstream EMM 14 or relay 16 failure. Once diagnosed, the problem may be easily addressed.

While the above describes a meter reading system in which utility meter data is transferred via RF transmissions and PSTN, it should be noted that meter reading system 10 also provides the ability to provide utility meter 12 data to customers via the traditional method of KYZ pulses.

The above-described meter reading system 10 serves to significantly increase both the quantity of high-functionality meters that are remotely read via automatic procedures and the rate at which the utility meters are read. For instance, the above-described meter reading system 10 can increase the number of customers given automatic read over 50 times, as compared to a typical telephone system with the associated dial-up and modem negotiation delays, while the typical interrogation rate is increased from monthly to daily or hourly. These improvements are realized through the dedicated wireless network of meter reading system 10. Further, through the use of radio, the significant delays due to dial-up and modem negotiation are substantially eliminated. Additionally, the use of radio transmission allows a significant reduction in the number of wire-line connections that are needed (only the wire-line connection between hubs 18 and PSTN 24 are needed) and, thus, a substantial reduction in the associated installation and operating expenses. And, meter reading system 10 is able to utilize existing meters 12 by introducing a selectable daughter board concept.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

What is claimed:

1. A system for communicating with a plurality of utility meters, comprising:

plurality of communication means for communicating with at least one of said plurality of utility meters, for obtaining utility meter data and, if the obtained utility meter data is not in a first system communication format, for translating said utility meter data into said first system communication format;

translation means communicatively coupled to said plurality of communication means, for receiving said utility meter data that is only in said first system communication format and for translating the received utility meter data into a second system communication format; and data collection means communicatively coupled to said translation means, for receiving and collecting utility meter data that is only in said second system communication format.

2. The system of claim 1, further comprising relay means for relaying utility meter data in said first system communication format from at least one of said plurality of communication means to said translation means.

3. The system of claim 1, wherein each of said utility meters has a pre-determined utility meter communication format and wherein said plurality of communication means are selected on the basis of said plurality of communication means including a communication format that is equivalent to said pre-determined utility meter communication format.

4. The system of claim 1, wherein said data collection means is for transmitting messages to said translation means in said second system communication format and wherein said translation means is for translating said messages from said data collection means into said first system communication format and for transmitting messages to at least one of said plurality of communication means in said first system communication format.

5. The system of claim 4, wherein said data collection means is for sending a message in said second system communication format to effect calibration of said translation means.

6. The system of claim 4, wherein said data collection means is for sending a message in said second system communication format to said translation means, said translation means for translating said message into said first system communication format and for sending the translate message to at least one of said plurality of communication means to effect calibration of said at least one of said plurality of communication means.

7. The system of claim 1, wherein said plurality of communication means and said translation means are distributed in a cellular arrangement.

8. The system of claim 7, wherein said cellular arrangement reduces communication interference in said system.

9. The system of claim 1, wherein said first system communication format comprises radio frequency communication.

10. The system of claim 1, wherein said second system communication is selected from the group consisting of an analog telephone communication format and a digital telephone communication format.

11. The system of claim 1, wherein each of said plurality of communication means is capable of being communicatively coupled to at least one of said plurality of utility meters without modification of said at least one of said plurality of utility meters.

12. The system of claim 1, wherein said plurality of communication means are accessed in an order that reduces communication interference within said system.

13. A node for communicating with a utility meter having a predetermined communication format, comprising:

communication means for communicating with and obtaining data from said utility meter, wherein said communication means is selected on the basis of said communication means including a communication format that is equivalent to said predetermined communication format; and translation means communicatively coupled to said communication means, for translating the obtained data to a predetermined node communication format if the predetermined communication format of said utility meter is not equivalent to said predetermined node communication format.

14. The node of claim 13, wherein said communication means comprises an electronic daughter board.

15. The node of claim 13, wherein said translation means comprises an electronic transceiver.

16. The node of claim 13, wherein said predetermined node communication format comprises radio frequency communication.

17. The node of claim 13, wherein said translation means is calibrated with a global positioning system signal.

18. The node of claim 13, wherein said communication means is capable of being communicatively coupled to said utility meter without modification of said utility meter.

19. A system for communicating with a plurality of utility meters, wherein each of said plurality of utility meters has a predetermined communication format, comprising:

a plurality of communication devices, wherein each communication device includes a utility meter communicator and a translation communicator that is communicatively coupled to said utility meter communicator, wherein said utility meter communicator is selected on the basis that it includes a communication format that is equivalent to said predetermined communication format, and wherein said utility meter communicator is communicatively coupled to said at l east one of said plurality of utility meters and obtains data from said at least one of said plurality of utility meters in said predetermined communication format, and wherein said translation communicator translates the obtained data into a first system communication format if said predetermined communication format is not equivalent to said first system communication format;

a system translator communicatively coupled to said plurality of communication devices, wherein said system translator receives said data only when said data is in said first system communication format, and wherein said system translator translates the received data into a second system communication format; and a data collector communicatively coupled to said system translator, wherein said data collector receives and collects said data only when said data is in said second system communication format.

20. The system of claim 19, wherein said utility meter communicator comprises an electronic daughter board.

21. The system of claim 19, wherein said translation communicator comprises an electronic transceiver.

22. The system of claim 19, wherein said first system communication format is radio frequency communication.

23. The system of claim 19, wherein said second system communication format is selected from the group consisting of an analog telephone communication format and a digital telephone communication format.

24. The system of claim 19, wherein said plurality of communication devices and said system translator are distributed in a cellular arrangement.

25. The system of claim 24, wherein said cellular arrangement reduces communication interference in said system.

26. The system of claim 19, further comprising a relay, wherein said relay operates to relay data in said first system communication format from at least one of said plurality of said communication devices to said system translator.

27. The system of claim 19, wherein each of said plurality of communication devices is capable of being communicatively coupled to at least one of said plurality of utility meters without modification of said at least one of said plurality of utility meters.

28. The system of claim 19, wherein said data collector sends a message to said system translator in said second system communication format to effect calibration of said system translator.

29. The system of claim 19, wherein said data collector sends a message to said system translator in said second system communication format, wherein said system translator translates said message to said first system communication format and sends the translated message to at least one of said plurality of utility meters to effect calibration of said at least one of said plurality of utility meters.

30. The system of claim 19, wherein said plurality of communication devices are accessed in an order to reduce communication interference within said system.

31. A method for collecting data from a plurality of utility meters wherein each utility meter has an identifiable communication format, comprising the steps of:

selecting a utility meter communicator on the basis that said utility meter communicator includes a communication format that is equivalent to said identifiable communication format;

communicating with each of said plurality of utility meters by using said identifiable communication format of said utility meter communicator to obtain utility meter data from each of said plurality of utility meters;

translating the obtained utility meter data from each of said plurality of utility meters only into a first pre-established communication format, if said identifiable communication format is not equivalent to said first pre-established communication format;

translating the utility meter data from said first pre-established communication format to a second pre-established communication format; and collecting utility meter data that is only in said second pre-established communication format.

32. The method of claim 31, further comprising the step of communicatively coupling said utility meter communicator to at least one of said plurality of utility meters without modification of said at least one of said plurality of utility meters.

33. The method of claim 31, further comprising the step of relaying the obtained utility meter data to a translating device prior to said step of translating the utility meter data from said first pre-established communication format to a second pre-established communication format.

34. The method of claim 31, further comprising the step of preparing utility billings from the collected utility meter data.

* * * * *

UNITED STATES PATENT AND TRADEMARK OFFICE
CERTIFICATE OF CORRECTION

| | |
|---|---|
| PATENT NO. | : 6,333,975 B1 |
| DATED | : December 25, 2001 |
| INVENTOR(S) | : Brian T. Brunn, John W. MacConnell, Laurent Maleysson, Eric. W. Lofstad |

It is certified that error appears in the above-identified patent and that said Letters Patent is hereby corrected as shown below:

Column 2,
Line 50, please change "FIG., 1" to read -- FIG. 1, --.

Column 5,
Line 23, please change "Head-end" to -- Head-End --.

Column 7,
Line 8, please insert -- as -- following the word "well".
Line 66, please insert -- be -- following the word "to".

Column 9,
Line 6, please change "cell" to -- cells --.
Line 38, please change "required" to -- require --.

Column 10,
Line 13, please insert a space following the word "board,".

Column 12,
Line 26, please insert a space following "EMM".

Column 15,
Line 9, please change "1 east" to -- least --.

Signed and Sealed this

Twenty-third Day of April, 2002

*Attest:*

JAMES E. ROGAN
*Attesting Officer*   Director of the United States Patent and Trademark Office